(12) United States Patent
Dinu et al.

(10) Patent No.: US 10,373,052 B2
(45) Date of Patent: *Aug. 6, 2019

(54) METHOD AND SYSTEM FOR TRACKING AN OBJECT

(71) Applicant: FotoNation Limited, Galway (IE)

(72) Inventors: Dragos Dinu, Brasov (RO); Mihai Constantin Munteanu, Brasov (RO); Alexandru Caliman, Brasov (RO)

(73) Assignee: FotoNation Limited, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/426,413

(22) Filed: Feb. 7, 2017

(65) Prior Publication Data
US 2017/0358086 A1    Dec. 14, 2017

Related U.S. Application Data

(63) Continuation-in-part of application No. PCT/EP2016/063446, filed on Jun. 13, 2016.

(51) Int. Cl.
*G06N 3/08* (2006.01)
*G06T 7/246* (2017.01)
*G06N 3/04* (2006.01)
*G06T 7/269* (2017.01)
(Continued)

(52) U.S. Cl.
CPC ............ *G06N 3/08* (2013.01); *G06K 9/4628* (2013.01); *G06K 9/627* (2013.01); *G06N 3/04* (2013.01);
(Continued)

(58) Field of Classification Search
None
See application file for complete search history.

(56) References Cited

U.S. PATENT DOCUMENTS 7,099,510 B2   8/2006  Jones et al.
7,315,631 B1 *  1/2008  Corcoran ........... G06K 9/00234
                                          382/118
(Continued)

FOREIGN PATENT DOCUMENTS

WO   2008/018887 A1   2/2008
WO   2014/146983 A2   9/2014
WO   2017/054941 A1   4/2017

OTHER PUBLICATIONS

Navneet Dalal and Bill Triggs, "Histograms of Oriented Gradients for Human Detection", IEEE Computer Society Conference on Computer Vision and Pattern Recognition, vol. 1, pp. 886-893, Jun. 25-26, 2005.

(Continued)

*Primary Examiner* — Vikkram Bali

(57) ABSTRACT

A method of tracking an object across a stream of images comprises determining a region of interest (ROI) bounding the object in an initial frame of an image stream. A HOG map is provided for the ROI by: dividing the ROI into an array of M×N cells, each cell comprising a plurality of image pixels; and determining a HOG for each of the cells. The HOG map is stored as indicative of the features of the object. Subsequent frames are acquired from the stream of images. The frames are scanned ROI by ROI to identify a candidate ROI having a HOG map best matching the stored HOG map features. If the match meets a threshold, the stored HOG map indicative of the features of the object is updated according to the HOG map for the best matching candidate ROI.

21 Claims, 6 Drawing Sheets

(51) Int. Cl.
  *G06K 9/46* (2006.01)
  *G06K 9/62* (2006.01)
(52) U.S. Cl.
  CPC .............. *G06T 7/246* (2017.01); *G06T 7/248* (2017.01); *G06T 7/269* (2017.01); *G06T 2207/10016* (2013.01); *G06T 2207/10024* (2013.01); *G06T 2207/20021* (2013.01); *G06T 2207/20084* (2013.01); *G06T 2207/20104* (2013.01)

(56) References Cited

U.S. PATENT DOCUMENTS

| | | | | |
|---|---|---|---|---|
| 9,846,821 B2* | 12/2017 | Li | ............................ | G06K 9/627 |
| 2017/0091950 A1* | 3/2017 | Munteanu | ................ | G06T 7/269 |

OTHER PUBLICATIONS

Navneet Dalal, "Finding People in Images and Videos" PhD Thesis, L'institu National Polytechnique De Grenoble, Jul. 17, 2006.
U.S. Appl. No. 62/085,346, filed Nov. 28, 2014.
David Held, Sebastian Thrun and Silvio Savarese "Learning to Track at 100 FPS with Deep Regression Networks" European Conference on Computer Vision, ECCV, 2016.
S. Ren, K. He, R. Girshick, and J. Sun, "Faster R-CNN: Towards Real-Time Object Detection with Region Proposal Networks," Advances in Neural Information Processing Systems, NIPS, 2015.
C. Szegedy, W. Liu, Y. Jia, P. Sermanet, S. Reed, D. Anguelov, D. Erhan, V. Vanhoucke and A. Rabinovich, "Going Deeper with Convolutions," In Computer Vision and Pattern Recognition, CVPR, 2015.

* cited by examiner

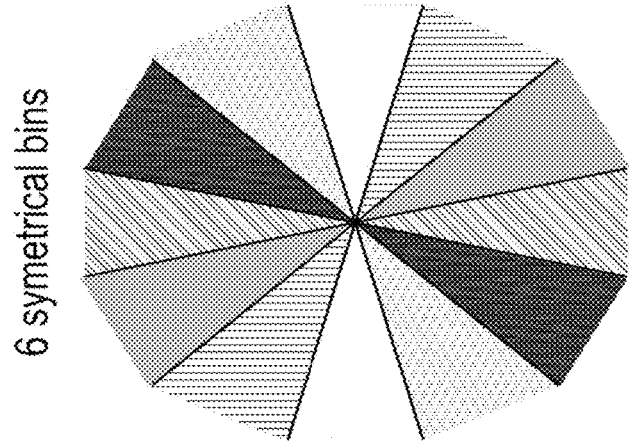
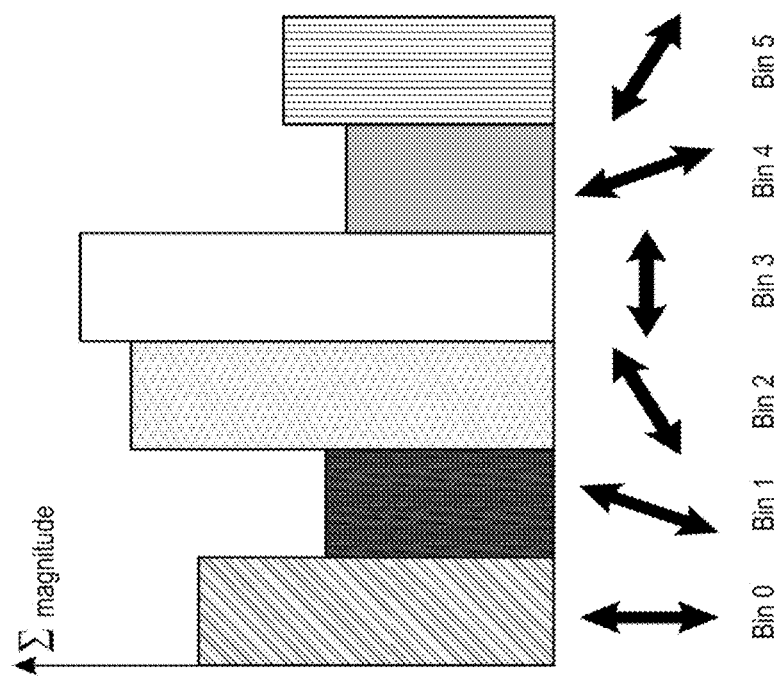
Figure 3

METHOD AND SYSTEM FOR TRACKING AN OBJECT

RELATED APPLICATIONS

The present application is a continuation-in-part of PCT Application No. PCT/EP2016/063446.

FIELD

The present invention relates to a method and system for tracking an object of interest across a stream of images.

BACKGROUND

US 2002/0102024, hereinafter Viola-Jones discloses a method for detecting a region of interest (ROI) comprising an object such as a face within an acquired image, usually an image frame in a video stream. In brief, Viola-Jones first derives an integral image from the acquired image. Each element of the integral image is calculated as the sum of intensities of all points above and to the left of the point in the image. The total intensity of any sub-window in an image can then be derived by subtracting the integral image value for the top left point of the sub-window from the integral image value for the bottom right point of the sub-window. Intensities for adjacent sub-windows can be efficiently compared using particular combinations of integral image values from points of the sub-windows.

Object detectors based on Viola-Jones, use a chain (cascade) of, for example, 32 pre-trained classifiers based on rectangular (and increasingly refined) Haar features with the integral image by applying the classifiers to a candidate sub-window within the integral image. For a complete analysis of a scan area within an acquired image, this sub-window is shifted incrementally across the integral image until the scan area has been covered.

It will be appreciated that applying Viola-Jones analysis to every portion of an image for every size of object to be detected can still be quite processor intensive and this could prevent a system operating quickly enough to detect and track an object across a stream of images in real time.

Thus, many improvements of this basic technique have been developed. For example, PCT Application WO2008/018887, the disclosure of which is incorporated by reference, discloses an image processing apparatus for tracking faces in an image stream. Each acquired image of the stream is sub-sampled at a specified resolution to provide a sub-sampled image. Fixed size face detection is applied to at least a portion of the integral image to provide a set of candidate face regions. Responsive to the set of candidate face regions produced and any previously detected candidate face regions, the resolution is adjusted for sub-sampling a subsequent acquired image.

There remains a need however for a more efficient mechanism for tracking one or more objects across a stream of images.

SUMMARY

According to the present disclosure there is provided a method of tracking an object.

In a further aspect there is provided a system for tracking an object.

Embodiments of the invention can provide simple and hardware friendly object tracking.

In some embodiments, an original ROI that contains an object of interest (target) that is to be tracked is automatically detected in an initial frame within a sequence of frames using a first detection mechanism.

Alternatively, a ROI could be defined through interaction with an application in which a user defining a box with a pointer such as a mouse or on a touchscreen. In this case, the user could interact with a preview image stream and once the ROI is defined, the frame in which it has been defined can be taken as the initial frame.

In some embodiments, a feed forward neural network (NN) is first trained by determining the weights for the connections within the neural network for the ROI based upon the features of the ROI within the initial frame.

Each subsequent frame, is scanned with a sliding window around the location of the last detected ROI, with the trained NN being used to look for a ROI with the best match based on the existing weights.

The location of the ROI with the best match is reported and the NN is retrained with the features for the newly found ROI with the best match.

In this way the method can adapt to small changes of the tracked object from frame to frame (e.g. rotation, illumination), or changes in the ROI background area around the object.

NN retraining can be done taking into account only the ROI in the current frame, or a history of the tracked ROI from the last X frames in a video sequence.

BRIEF DESCRIPTION OF THE DRAWINGS

An embodiment of the invention will now be described, by way of example, with reference to the accompanying drawings, in which:

FIG. 3 shows a HOG bin configuration employed in an embodiment of the present invention;

DESCRIPTION OF THE EMBODIMENTS

Figure 1:
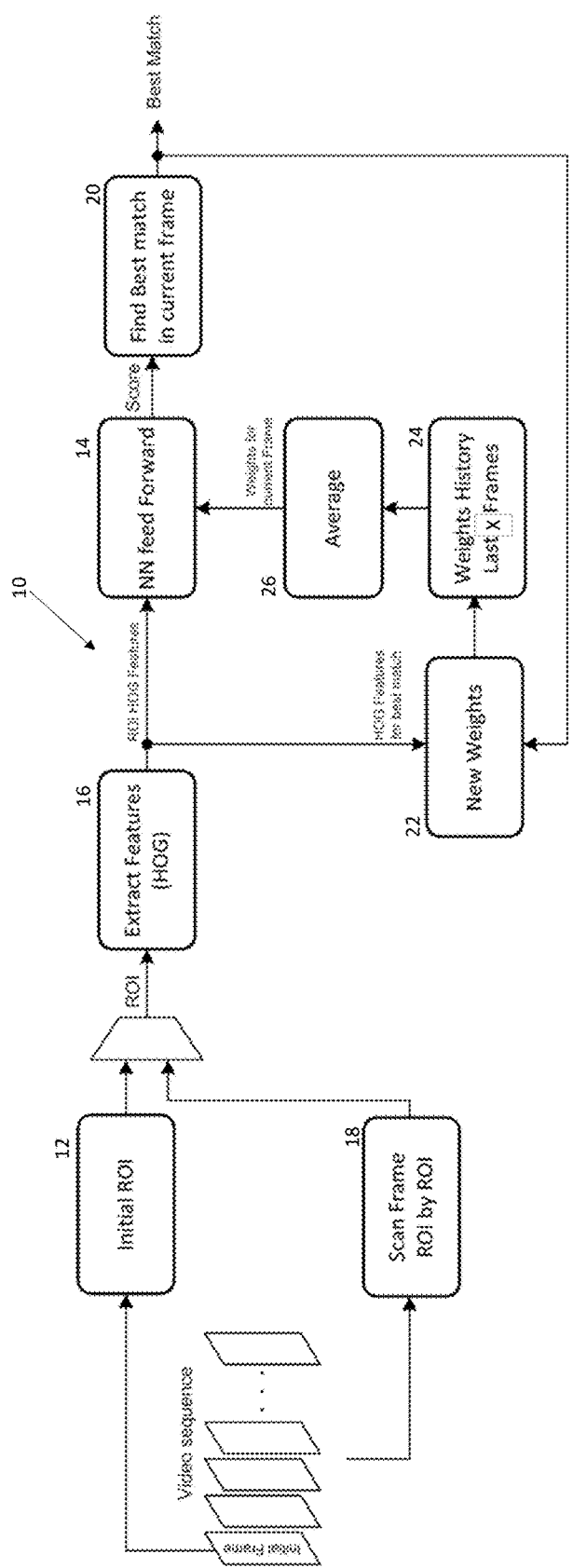
FIG. 1 shows schematically an object tracking system according to an embodiment of the present invention.

FIG. 1 shows an object tracking system 10 according to an embodiment as disclosed herein.

The system 10 is typically implemented within an image acquisition device which obtains a video sequence comprising a series of frames from a source. Typically, the system is implemented in a device such as a digital camera, smart phone, tablet or general purpose computer including a camera and the sequence of images is provided directly. In alternative embodiments, the system 10 could be implemented in a network device which obtains the video sequence from a separate source device across the network.

In brief, the system 10 includes a first mechanism 12 for determining a region of interest (ROI) within an image. In one embodiment, the mechanism 12 comprises a pre-trained classifier based on Haar features such as disclosed in PCT Application WO2008/018887 referred to above. When such a classifier is applied to an image, it can identify one or more ROI within the image. Depending on the types of classifier employed, the ROI can vary in size, orientation and content. In any case, once a ROI is identified in a frame of the image sequence, this frame is treated as an initial frame.

In an alternative embodiment, the system 10 is implemented within an interactive device where the first mechanism 12 comprises an interactive application arranged to provide a preview display of a video sequence. The user can interact with the preview to manually define one or more ROI within the preview. An image in which such a ROI is defined can be regarded as an initial frame for the purposes of the present description.

While two examples of first mechanism 12 have been mentioned above, it will be appreciated than any suitable mechanism for identifying a ROI within an initial frame can be employed.

Also, while the present embodiment is described in terms of processing a single ROI within an image, it will be appreciated that the invention is equally applicable to detecting and tracking more than one ROI within an image sequence.

In any case, for any given ROI in an initial frame which has been identified by the first mechanism 12 or as will be explained later, for any candidate ROI from a subsequent frame which is to be examined, the features of the ROI are extracted by a feature extraction block 16.

In the present embodiment, only one type of feature is used: Histogram of Oriented Gradients (HOG). Navneet Dalal and Bill Triggs, "Histograms of Oriented Gradients for Human Detection", IEEE Computer Society Conference on Computer Vision and Pattern Recognition, vol 1, page 886-893, 25-26 Jun. 2005; and Navneet Dalal "Finding People in Images and Videos" PhD Thesis, L'institut National Polytechnique De Grenoble, 17 Jul. 2006, disclose HOG descriptors for use in image processing including for object detection and/or classification.

Note that in typical applications based on HOG classifiers, the classifiers need to be trained a priori and this can be an involved process. No such a priori training is required in the present embodiments.

Figure 2:
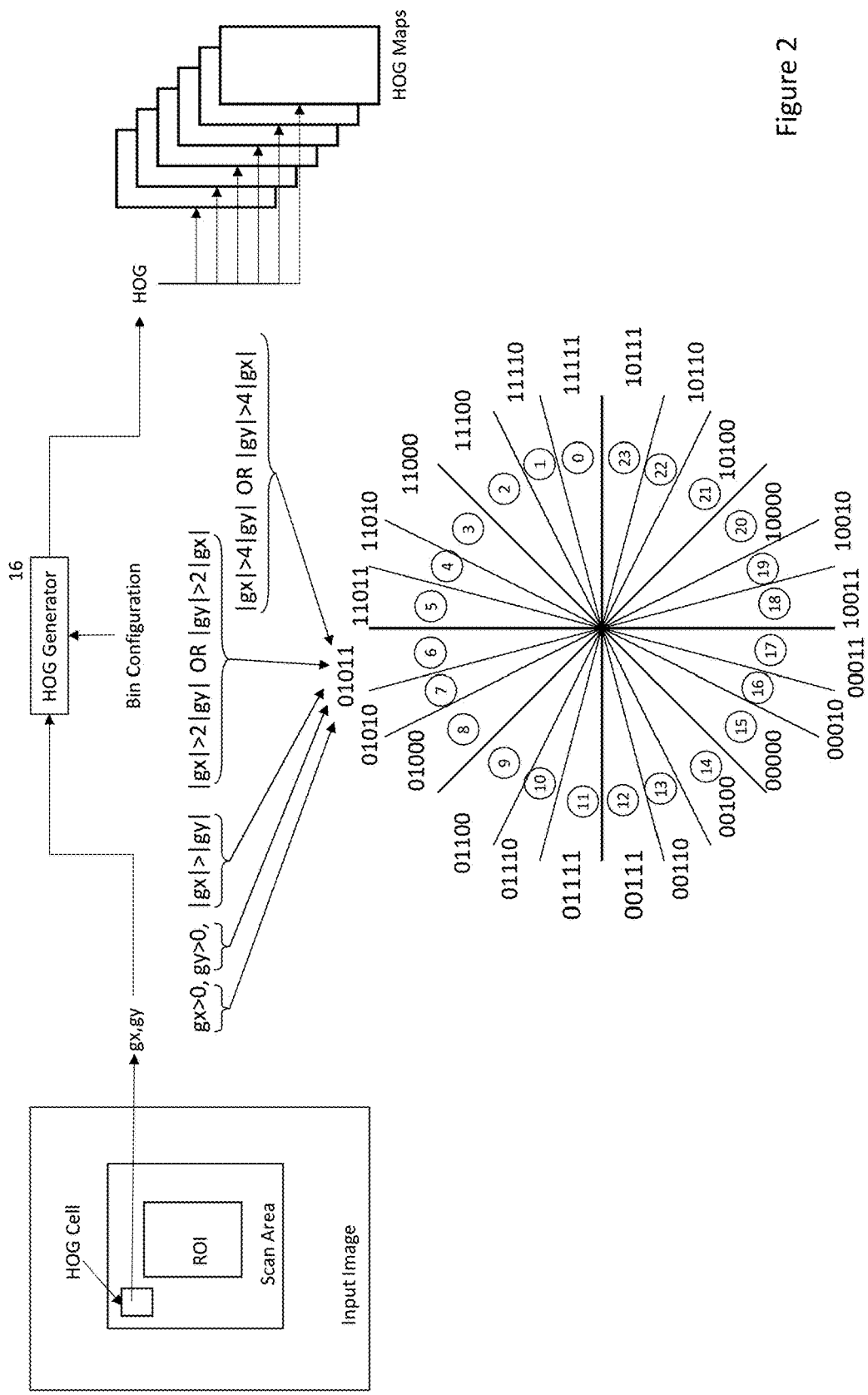
FIG. 2 illustrates generally how a histogram of gradients (HOG) is extracted from an image and how this is used to generate corresponding HOG maps for use in the embodiment of FIG. 1.

Referring to FIG. 2, when employing HOG, an image is divided into an array of cells. In the present example, 4×4 cells are used, however the size of cell could vary and need not necessarily be square. The cells can abut, overlap or be spaced apart in the x and/or the y direction within an image and in the present application, cells overlap by 50% in each of the x and y directions.

A horizontal gradient, gx and a vertical gradient gy are determined for each pixel of a cell and an orientation of the gradient is then determined. For images with 8 bit pixels, the values of gx and gy can be up to 255 i.e. the difference between pixel values on either side of a given pixel within an image, the magnitude of the gradient, could be up to 255.

The range of orientations from 0 to 360° is divided into a number of bins, q, and the orientation for each pixel is mapped to a bin. A HOG for a cell can comprise a simple count of the number of instances of orientations of pixels found in each bin.

Some HOG generators are based on calculating the orientation of the gradient as $\tan^{-1} gy/gx$ in order to determine the appropriate bin for a pixel gradient. However, it will be seen that performing this calculation for each pixel could be processor intensive. U.S. Patent Application No. 62/085,346 filed 28 Nov. 2014, the disclosure of which is incorporated by reference, discloses a method for producing a HOG based on allocating a gradient for a pixel to one of a plurality of sectors, each sector extending through a range of orientation angles and at least some of said sectors being divided from adjacent sectors along lines including $gx=2^n \cdot gy$. One or more sectors can be associated with a bin; and each instance of a pixel gradient of a cell associated with a bin can be counted to provide a HOG for the cell. This technique therefore enables a range of orientations to be divided into approximately equal sectors and to allocate gradients to those sectors without requiring a trigonometric function.

FIG. 2 shows a range of orientations divided into 24 sectors numbered from 0-23 divided along these lines. In this case, each sector can be addressed with a 5 bit mask with the criteria for each bit of the mask beginning at the most significant bit as follows:
1) $gx>0$;
2) $gy>0$;
3) $|gx|>|gy|$;
4) $|gx|>2|gy|$ OR $|gy|>2|gx|$;
5) $|gx|>4|gy|$ OR $|gy|>4|gx|$ As illustrated, the values required for a gradient to lie in sector 6, for example, are 01011.

Referring now to FIG. 3, in the embodiment, the 24 sectors are combined into q=6 bins as follows:
Bin 0: 5+6+17+18
Bin 1: 15+16+3+4
Bin 2: 1+2+13+14
Bin 3: 0+23+11+12
Bin 4: 7+8+19+20
Bin 5: 9+10+21+22

Thus for example, a pixel having a gradient falling in any of sectors 5, 6, 17 or 18 would be allocated to bin 0.

FIG. 3 also shows a typical HOG for a cell where the y axis (Σ magnitude) indicates the count for each bin.

It will be appreciated that the above arrangement of bins is for exemplary purposes only and that q may vary from implementation to implementation; that bin sizes can be uniform or non-uniform; and that bins can span continuous or non-continuous ranges of orientations.

Referring back to FIG. 2, in the embodiment, the HOG generator 16 produces q=6 HOG maps for each scanned area of an image based on the above defined bins, the scanned area being divided into M×N cells. Each map therefore comprises M×N magnitudes, each magnitude corresponding to the respective bin count for a corresponding cell of the scan area.

When using a simple count for HOG bins, for a 4×4 cell, the magnitudes for each bin will range from 0-16 and so for larger cells this range will be greater and so the HOG map pixels need to be scaled accordingly.

In other applications, a magnitude for each pixel gradient can also be taken into account when generating a HOG for a cell. As disclosed in U.S. Patent Application No. 62/085, 346, a magnitude of a gradient for a pixel can be calculated as:

$$mag = \sqrt{gx^2 + gy^2}$$

or approximated as follows:

$$mag = |gx| + |gy| - \min(gx, gy)/2$$

In either case, the value for each bin in a HOG can comprise the sum of magnitudes of gradients for pixels with orientations in that bin. Using this approach takes into account the weight of pixel gradients in a given direction, but it also means that for a 4×4 cell of an 8 bit image, the value for a bin might range from 0 to 16×255. As will be appreciated from the description below, it can be useful for the bin values for such a HOG map to be normalized and so in some embodiments, once calculated, bin values can normalized so that values for a HOG map range from 0 to 255 by scaling the initially calculated bin values as required.

U.S. Patent Application No. 62/085,346 referred to above discloses how when scanning across a scan area of an input image, a HOG generator can produce 1 HOG/clock cycle. Thus, for an area of an image to be scanned, HOG maps can be produced in close to the same number of clock cycles as pixels or cells within the scan area.

It will be appreciated nonetheless that embodiments of the present invention can use either the advantageous HOG generator described in U.S. Patent Application No. 62/085,346 or any other suitable HOG generator to extract the necessary HOG features from a ROI within an image.

In the embodiment of FIG. 1, the features of an identified ROI within the initial frame i.e. the HOG map values, are used within a second mechanism for tracking the object within the ROI detected within the initial frame through subsequent frames of the video sequence. In the embodiment, the features are used as weights for the neurons of a feed forward neural network (NN) 14 as will be described in more detail below.

Figure 4:
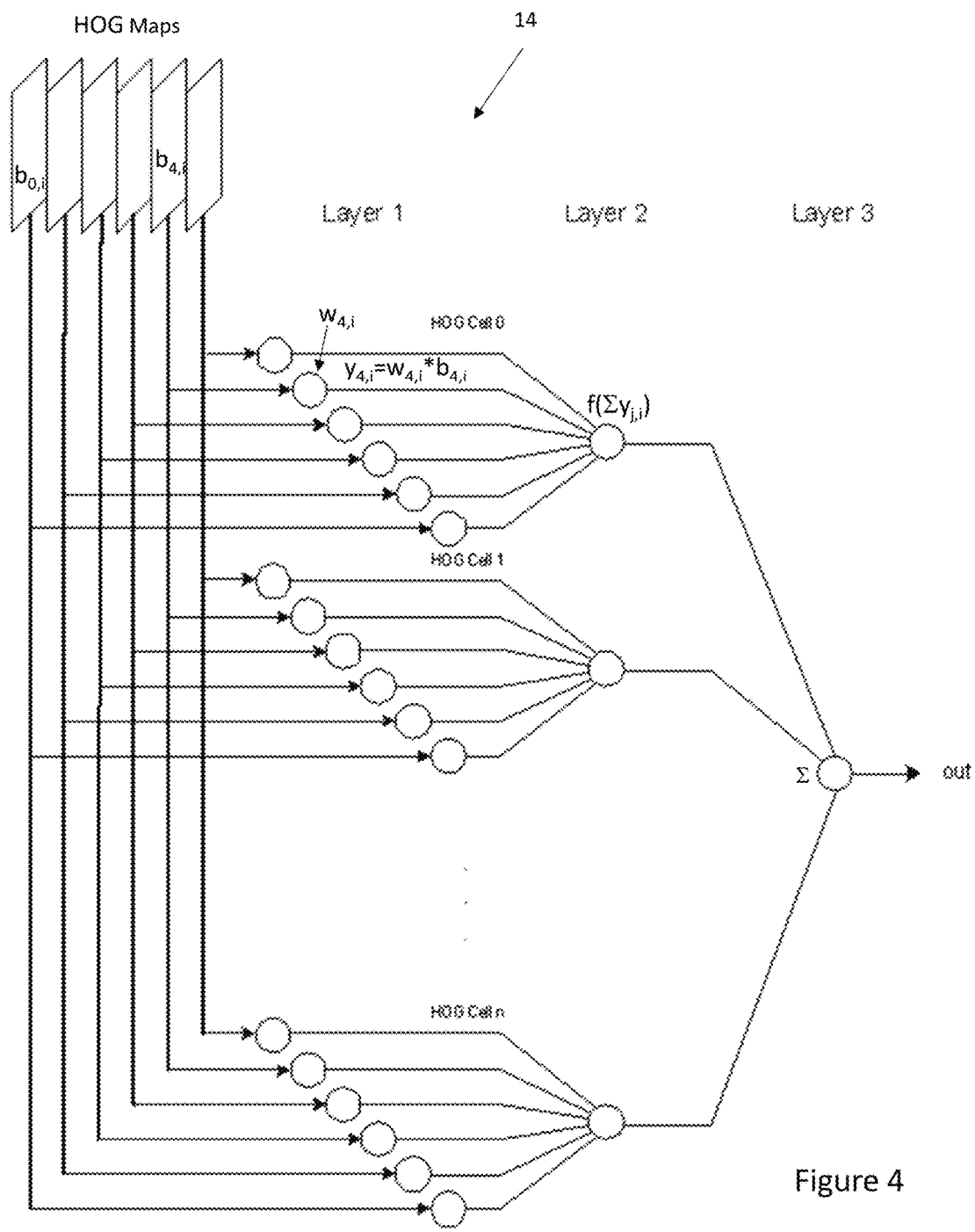
FIG. 4 shows a neuron architecture employed within the neural network of FIG. 1.

Referring now to FIG. 4 which shows the structure of the neural network 14. The network has 3 layers of neurons with Layer 1 comprising M×N×q neurons, where q=6, the number of bins in each HOG. Thus, each group of q neurons corresponds to the set of bin values for a given cell of the scan area.

For an initial frame, each HOG map value for the detected ROI (normalized if required) is used as the respective weight $w_{j,i}$ for a corresponding neuron of Layer 1.

Layer 2 comprises M×N neurons at which the outputs of a corresponding 6 neurons from Layer 1 are summed and fed through an activation function f( ).

In the embodiment, a sigmoid activation function is employed and again, rather than require a trigonometric function or exponentiation to be performed at the neurons of Layer 2, a piece-wise linear approximation of the sigmoid function is used.

Figure 5:
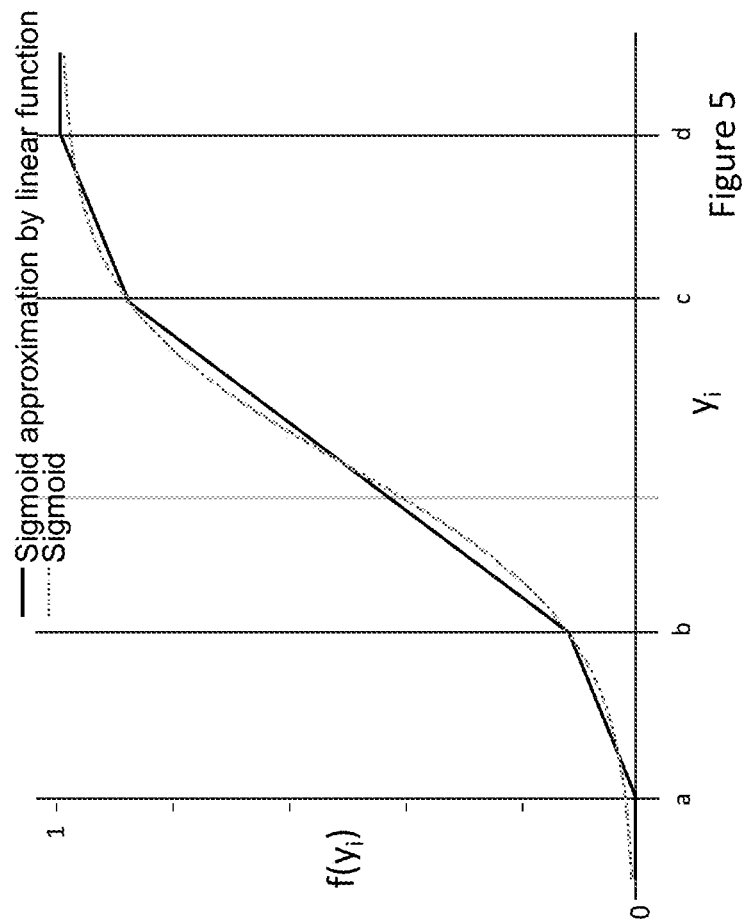
FIG. 5 an exemplary Sigmoid activation function and a piecewise linear approximation of such a function employed within the embodiment of FIG. 1.

Referring to FIG. 5, the piece-wise approximation is of the following form:

$$f(y_i) = \begin{cases} 0, & \text{if } y_i < a \\ 0.0625 \times y_i + 0.25, & \text{if } y_i \in [a, b) \\ 0.1875 \times y_i + 0.5, & \text{if } y_i \in [b, c) \\ 0.0625 \times y_i + 0.75, & \text{if } y_i \in [c, d) \\ 1, & \text{if } y_i \geq d \end{cases}$$

Here $y_i = \Sigma_{j=0}^{q-1} y_{j,i}$ where $y_{j,i}$ comprises the product of a weight $w_{j,i}$ and a bin value $b_{j,i}$ for a neuron in Layer 1. Layer 2 has neurons with q=6 inputs that combine the q corresponding bins from each HOG cell into a single output.

In the example, the output of each neuron of Layer 2 is scaled from 0 to 1, however, it will be appreciated that any suitable scale could be employed. Similarly, the values a, b, c and d are scaled according to the size of HOG cell.

Layer 3 comprise a single neuron summing the outputs of the M×N Layer 2 neurons to provide a single output value (score). The output value is therefore proportional to the level of match between the HOG map values used for the weights of the Layer 1 neurons and the HOG map values provided for a candidate ROI.

The nodes of Layers 2 and 3 may be weighted as described in more detail below.

A particularity of the neural network 14 is that is not fully connected i.e. the inter-layer connections, especially those from the HOGs maps to the neurons of Layer 1 are kept local. This reduces the complexity of the network and the computational cost.

Again, the above described arrangement of neural network 14 is provided for exemplary purposes only and it will be appreciated that in variants of the described embodiments, the number of neurons, their respective functions and their interconnections may vary.

For example, neurons in Layer 1 might be multi-input neurons combining information from multiple bins.

In other variants, weights can be determined not only for nodes of Layer 1, but for each layer of the neural network 14. Thus, the weights for Layer 1 can be calculated as above, but in this case, each neuron of Layer 1 would also implement a sigmoid activation function.

After determining the weights for the Layer 1 based on the initial frame containing a ROI, the activation function outputs of the Layer 1 nodes for a given cell would then be combined and used as the weights for Layer 2 nodes. These weights could then be fed directly as outputs and combined to act as the weight for the Layer 3 node.

The output of the Layer 1 nodes resulting from the combination of a HOG map for a candidate ROI and the Layer 1 weights could then be fed as an input to Layer 2 nodes, where it could be normalized and multiplied by the Layer 2 weights; and subsequently, the output of the Layer 2 nodes resulting from the combination of the Layer 1 outputs and the Layer 2 weights could then be normalized and fed as an input to the Layer 3 node. In Layer 3, the single input could be multiplied by a single weight to provide an output score.

Again, the weights for the Layer 1, Layer 2 and Layer 3 nodes for a best match candidate ROI would be used for determining the weights for scanning a subsequent frame and updated in the same manner as described above.

Referring back to FIG. 1, for the initial frame, the HOG maps (normalized if required) for an initial ROI containing an object of interest (target) are used to generate the initial weights for the neurons of Layer 1.

Then, subsequent frames of the video sequence, are scanned in the vicinity of the location of the ROI from the immediately preceding frame or a function of the location of the ROI from the immediately preceding frames. So for example, if significant frame-to-frame movement is detected a scan area around a previously detected ROI might need to be relatively large to capture all suitable potential candidate ROI, whereas for more static content, the scan area could be more closely tied to the previously detected ROI.

Note that the scan area need not be symmetric about a previously detection ROI and where frame-to-frame motion indicates movement of a subject in a given direction, the scan area could be defined accordingly.

Indeed, in extremis, inter-frame movement might be such that a scan area for a subsequent image might not completely bound a ROI detected in a previous image—nonetheless, the scan area will always need to be at least as large as a ROI.

In this respect, PCT Application WO2014/146983, the disclosure of which is incorporated by reference, discloses an efficient mechanism for providing a map indicating inter-frame movement in video sequence and such a map where available could be employed to define the extent and location of a scan area within a subsequent frame of a video sequence.

In any case, the scan area of a subsequent frame is scanned ROI by ROI with scanner 18 and HOG features are extracted by the HOG generator 16 for each candidate ROI and normalized if required so that they have the same range as for the weights of the neurons of Layer 1. Note therefore that ROI from subsequent frames need to be spatially scaled to provide HOG maps of the same size M×N as the HOG map for the ROI from the initial frame. Typically, the ROI for subsequent frames would be the same size as the ROI for the initial frame.

The combination of candidate ROI HOG features from a scan area of a subsequent frame and the existing weights are fed through the neural network 14 to produce a score. The best score for a candidate ROI in a given frame is noted by a scorekeeper 20. If the best score is above a threshold, the ROI producing that score is signaled as the new location for the target originally identified in the ROI from the initial frame. If the best score is not above a threshold, the system 10 might revert back to the first mechanism 12 to attempt to reacquire an initial ROI as before. In particular, this might occur where a target moves towards or away from an acquisition system to the extent that its scale makes tracking the object difficult. Nonetheless, as will be seen from the description below, as the features defining a target change over the course of a sequence tracking the target, the weights of the neural network 14 will also adapt so that even if the target appearance changes dramatically over the course of a sequence, it can still be tracked by the system 10.

In any case, if a best score above a threshold is produced by a candidate ROI, then the HOG maps produced by the HOG generator 16 for the candidate ROI are captured for use as new weights 22 within Layer 1 of the neural network 14.

These weights can be used directly or, as in the embodiment illustrated in FIG. 1, weights 22 from corresponding cells of the HOG map for the most recent best matching ROI can be combined with the weights 24 for the best scoring candidate ROI for the previous X frames, for example, using an averaging function 26, to generate the weights for the neurons of Layer 1 and possibly Layer 2 and/or Layer 3 to be used in inspecting the scan area of the subsequent image in the video sequence. Typical values for X might be from 1 to 8 and it is thought that values higher than 8 might be counterproductive, especially in a dynamic scene.

It will also be appreciated that functions other than the average function 26 can be used and, for example, a weighted average favoring the weights for best matching ROI from more recently acquired frames, or possible a median based function could also be used instead of the average function 26.

It has been found that the above described embodiment performs quite well in the face of: Illumination Variation (IV)—where the illumination in the target region is significantly changed; Scale Variation (SV)—where the ratio of boxes bounding a target in the initial frame and the target in a current frame is out of the range [1/ts, ts], ts>1 (ts=2); Motion Blur (MB)—where the target is blurred due to the motion of target or camera; In-Plane Rotation (IRP)—where the target rotates in the image plane; and Out-of-Plane Rotation (OPR)—wherein the target rotates out of the image plane.

The embodiment performs well with mid-range performance in the face of: Background Clutters (BC)—where the background near the target has the similar color or texture as the target; and Low Resolution (LR)—where the number of pixels inside the ROI is less than tr (tr=400).

It is nonetheless acknowledged that the embodiment may not perform very well in the face of: Occlusion (OCC)—where the target is partially or fully occluded; Deformation (DEF)—non-rigid object deformation; Fast Motion (FM)—where the motion of the ground truth is larger than tm pixels (tm=20); and Out-of-View (OV)—where some portion of the target leaves the view. The performance drop in these last 4 categories is due to the fact that the above described simple embodiment doesn't include a mechanism for handling sudden occlusion or an out of view subject, however, it will be appreciated that where target tracking is lost by the loop centered on the neural network 14, the system 10 can always revert back to the first mechanism 12 to reacquire a target and so in this respect, it need not perform any worse than a system based on the first mechanism alone.

Precision can be defined as a ratio of frames whose tracked ROI output is within a given threshold from a box actually bounding a target, measured by the center distance between ROI and the bounding box.

In terms of precision, the embodiment performs well with mid-range performance in the face of: IV, SV, IPR, OPR, LR; and not very well with low performance in the face of: OCC, DEF, FM, OV. Again, this low performance for the last 4 categories is due to the fact that the above described simple embodiment doesn't have a good support for have a suitable mechanism for handling sudden occlusion or an out of view subject.

Note that both the first mechanism 12 and the feature extractor 16 can operate on a grayscale image only and thus only a luminance channel for YCC, LAB or YTUV format images might be required by the system 10.

The above described embodiment has been described in terms of exhaustively scanning in both an x and a y direction across a scan area of an image to detect a best matching ROI from within the scan area. It will be appreciated however, that this involves $O(L^2)$ operations, where L is the width or height of the scan area. In alternative embodiments, the scanning path across the scan area could be guided by the score produced by successively scanned ROI. Thus, if movement in one direction improves the score more than movement in another direction, the scan path might follow the faster increasing score to reduce the overall number of operations required to identify the best match ROI.

The illustrated embodiments have been described as being based on a rectangular ROI and a rectangular scan area, however, it will be appreciated that in other embodiments a non-rectangular ROI and non-rectangular scan areas could be employed.

What will be appreciated however, is that in any implementation, the second mechanism 14, which need not be pre-trained, can be immediately provided with the HOG map features it needs to begin tracking an object by the pre-trained first mechanism 12.

Figure 6:
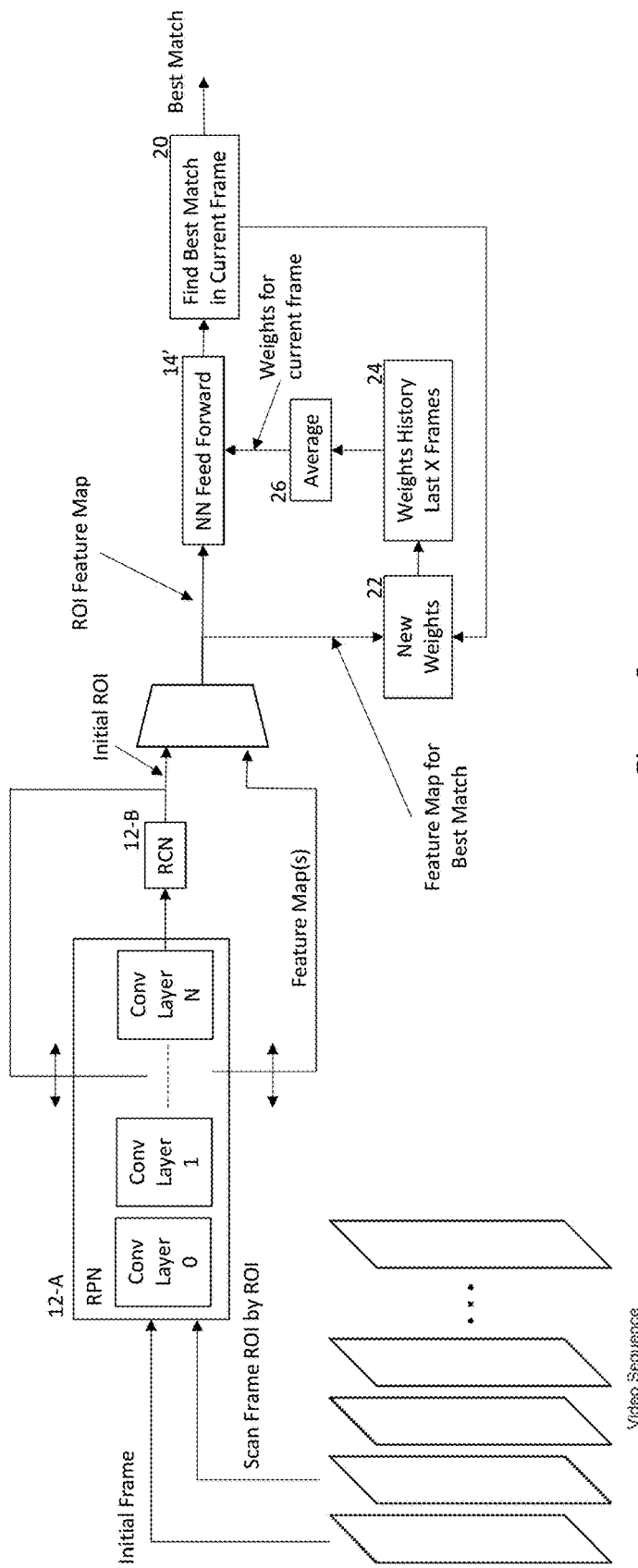
FIG. 6 illustrates an object tracking system according to a second embodiment of the present invention.

Referring now to FIG. 6, in a variation of the above described embodiments, tracking is based on feature maps generated by a neural network rather than specifically HOG maps.

As disclosed in David Held, Sebastian Thrun, Silvio Savarese, "Learning to Track at 100 FPS with Deep Regression Networks," in European Conference on Computer Vision, ECCV, 2016, it is known in object detection to employ a neural network, in this case CaffeNet, comprising a series of feature extracting convolution layers followed by a series of feature classification fully connected layers. Some such networks however, can involve millions of parameters and so it is not feasible to implement these in portable electronic devices such as smartphones.

Attempts to rationalize the implementation of such networks include S. Ren, K. He, R. Girshick and J. Sun, "Faster R-CNN: Towards Real-Time Object Detection with Region Proposal Networks," in Advances in Neural Information Processing Systems, NIPS, 2015 where the network comprises a Region Proposal Network (RPN) and Region Classification Network (RCN).

In the RPN, input images are processed by a feature extractor, for example, VGG16, GoogleNet (see C. Szegedy, W. Liu, Y. Jia, P. Sermanet, S. Reed, D. Anguelov, D. Erhan, V. Vanhoucke and A. Rabinovich, "Going Deeper with Convolutions," in Computer Vision and Pattern Recognition, CVPR, 2015.), ResNet-100, PVANet, and feature maps are used to predict a number of N (e.g. 200, 300) class-agnostic ROIs, each ROI being indicated by a location, scale and aspect ratio.

In the RCN part, the feature maps for the ROI generated by the RPN are fed to the classifier, in order to predict a class and class-specific box refinement for each proposed ROI.

Most computational cost is caused by the RCN part, due to the large number of ROIs to be classified. For instance, for Faster R-CNN algorithm with GoogleNet as RPN, 800×600 input image size and 300 ROIs proposed by the RPN, the entire computational power is 36 million multiplications for each frame, from which, 17 million multiplications are required by the RCN network. If the maximum number of ROIs proposed per frame is 500, then there are 41 million multiplications/frame from which, 22 million are executed in the RCN.

In the approach of FIG. 6, RPN 12-A followed by RCN 12-B is performed until a ROI containing an object of a given class to be tracked is located as in the case of Faster R-CNN. As in the case of Faster R-CNN, each of these networks 12-A and 12-B can be trained offline, possibly using techniques such as disclosed in U.S. patent application Ser. No. 15/413,312 to augment a training set of classified images, with their parameters pre-stored and accessible to the tracker.

Once such an object is located, rather than continue to use RCN 12-B, a feature map produced by a layer Y of the RPN is chosen to provide the weight values for the feed forward neural network 14'. Note that typically, as well as convolutional layers, the RPN may include some form of pooling or striding, and so the size of the feature maps will tend to reduce from layer to layer. The layer Y is chosen early enough in the RPN layer structure to have sufficient features and thus granularity to be useful, but not so early that the number of parameters which would then be required by the feed forward neural network 14' would be too great. For a typical 5 layer RPN 12-A, the feature map from layers 3 or 4 is likely to be most useful.

For subsequent frames, the RPN produces feature maps for a set of ROI around the current ROI determined for the previous frame and drawn from the same layer Y output as for the current ROI. Indeed, the RPN can be trained to determine the search zone in subsequent frames around a current ROI. The feature maps for the set of ROI are fed through to the feed forward neural network 14' where they are combined with the previously stored weights and the results from each ROI are used to choose the best match 20 in the current frame as in the approach of FIG. 1.

Now the feature map for the best match ROI can be combined with the weights history for the previous X frames through which the object has been tracked, for example using an averaging function 26, as before, to update the weights for the feed forward neural network 14'.

If at any stage, this tracking fails to track the object originally identified by the RCN 12-B satisfactorily, processing reverts to the final layers of the RPN 12-A and the RCN 12-B to attempt to locate a ROI for a class of interest ab initio. So for example, if the RCN 12-B were trained (offline) to detect 3 classes of people: standing, sitting and walking, if a person standing were initially detected, tracking might fail when they sat down and in this case, when re-enabled, the RCN 12-B would then likely locate the person sitting down, re-initialise the feed forward neural network 14' with the feature map for this ROI and then continue tracking as before. Note that in this case, the convolutional layer Y chosen to produce the feature map for the weights for the feed forward network 14' need not be the same as for other classes.

In some embodiments, the RCN 12-B, is enabled once every Z frames as well as if there is no valid match suggested by the tracker 14'-22. Newly detected objects are then used to reinitialize the feed forward neural network 14' with the weights (feature maps) for any newly detected object (either in place of or in addition to tracking the original object, where required).

By comparison to using features computed from a more deterministic feature extractor such as, Histogram of Oriented Gradients HOG, Haar, Census, LBP, Integral Image, the feature maps produced by the RPN 12-A are learned during training along with the RCN 12-B using a test dataset, and so they can be better suited and more robust for the classes of object being detected/tracked by the system of FIG. 6.

The invention claimed is:

1. An image processing system being arranged to track an object across a stream of images, the system comprising a processor arranged to:
 a) determine a region of interest (ROI) bounding said object in an initial acquired frame of said stream of images;
 b) provide a histogram of gradients (HOG) map for said ROI by:
  i) dividing said ROI into an array of M×N cells, each cell comprising a plurality of image pixels;
  ii) determining a HOG for each of said cells, each HOG comprising a plurality of q bins, each bin corresponding to a range of orientation angles, and each bin having a value being a function of a number of instances of a pixel gradient in a cell corresponding to the bin;
 c) store said HOG map as indicative of the features of said object by initially weighting each neuron of a first layer of neurons of a multi-layer neural network according to the HOG map for said ROI from said initial acquired frame;
 d) acquire a subsequent frame from said stream of images;
 e) scan at least a portion of said subsequent acquired frame ROI by ROI to identify a candidate ROI having a HOG map best matching the stored HOG map features, including the processor executing said neural network on each candidate ROI to provide an output proportional to the level of match between the HOG map values used for the weights of the first layer of neurons and the HOG map values provided for a candidate ROI;
 f) responsive to said match meeting a threshold, update the stored HOG map indicative of the features of said object according to the HOG map for the best matching candidate ROI including updating the weights for said neurons according to the HOG map for the best matching candidate ROI from said subsequent acquired frame; and
 g) repeating steps d) to f) until said match fails to meet said threshold.

2. An image processing system according to claim 1 wherein in order to scan said at least portion of the subsequent acquired frame the processor is arranged to multiply HOG map values for a candidate ROI from the subsequent acquired frame with weights stored from previous acquired frames.

3. An image processing system according to claim 1 wherein said processor is configured to perform a sigmoid activation function on the outputs of neurons from said first layer.

4. An image processing system according to claim 3 wherein said processor is configured to execute a third layer of said neural network by aggregating the outputs of the neurons of a second layer.

5. An image processing system according to claim 3 wherein said processor is arranged to provide a piecewise linear approximation f( ) of said sigmoid function.

6. An image processing system according to claim 5 wherein said approximation f( ) is defined as $$f(y_i) = \begin{cases} 0, & \text{if } y_i < a \\ 0.0625 \times y_i + 0.25, & \text{if } y_i \in [a, b) \\ 0.1875 \times y_i + 0.5, & \text{if } y_i \in [b, c) \\ 0.0625 \times y_i + 0.75, & \text{if } y_i \in [c, d) \\ 1, & \text{if } y_i \geq d \end{cases}$$

where $$y_i = \sum_{j=0}^{q-1} y_{j,i}$$

where $y_{j,i}$ comprises the product of a stored weight $w_{j,i}$ and a HOG map value $b_{j,i}$ for a candidate ROI subsequent frame.

7. An image processing system according to claim 1 wherein said neural network is a non-fully connected network.

8. An image processing system according to claim 1 wherein said neural network is a forward connected neural network.

9. An image processing system according to claim 1 further arranged to output the best matching candidate ROI as a boundary for said object.

10. An image processing system according to claim 1 further arranged to scale said ROI from subsequent acquired frames so that the HOG maps match the size of the stored HOG map.

11. An image processing system according to claim 1 wherein said range of angles for each bin is non-continuous.

12. An image processing system according to claim 1 wherein in order to scan said at least a portion of the subsequent acquired frame the processor is arranged to scan across a scan area of the subsequent acquired frame, ROI-by-ROI, said scan area being a function of said best matching candidate ROI from a previous acquired frame and inter-frame movement between a previous acquired frame and said subsequent acquired frame.

13. An image processing system according to claim 1 wherein said pixel values are intensity values.

14. An image processing system according to claim 1 wherein in order to determine a ROI in an initial acquired frame the processor is arranged to apply a cascade of Haar features to successive candidate ROI of said frame.

15. An image processing system according to claim 1 further comprising an interactive application for manually defining a ROI in order to determine the ROI in the initial acquired frame.

16. An image processing system according to claim 1 wherein each of said HOG map cells comprises 4×4 pixels.

17. An image processing system according to claim 1 wherein each of said HOG map cells overlap in at least one of x and y directions.

18. An image processing system according to claim 1 wherein in order to provide a HOG map the processor is arranged to:
 allocate a gradient to one of a plurality of sectors, each sector extending through a range of orientation angles and at least some of said sectors being divided from adjacent sectors along lines including gx=$2^n$·gy, where n is any integer value with a magnitude greater than or equal to 1;
 associate at least one sector with a bin; and
 count each instance of a pixel gradient of a cell associated with a bin to provide a HOG for said cell.

19. An image processing system according to claim 1 wherein said processor is arranged to update the stored HOG map as a function of the HOG map for the best matching candidate ROI for up to X frames previous to an acquired frame.

20. An image processing system according to claim 19 wherein said function is an average function.

21. An image processing system according to claim 1 wherein each bin has a value being a function of the respective magnitudes of pixel gradients in a cell corresponding to the bin, said processor being further arranged to normalize bin values so that bin values for a HOG map extend across a fixed range.

* * * * *